(12) United States Patent
Couse et al.

(10) Patent No.: US 9,317,625 B2
(45) Date of Patent: Apr. 19, 2016

(54) QUICK DIRECTORY SEARCH SYSTEM ON A TOUCH SCREEN DEVICE AND METHODS THEREOF

(75) Inventors: Peter Francis Couse, Ottawa (CA); Paul Fera, Ottawa (CA)

(73) Assignee: Mitel Networks Corporation, Ottawa (CA)

( * ) Notice: Subject to any disclaimer, the term of this patent is extended or adjusted under 35 U.S.C. 154(b) by 137 days.

(21) Appl. No.: 13/068,487

(22) Filed: May 11, 2011

(65) Prior Publication Data

US 2012/0287052 A1    Nov. 15, 2012

(51) Int. Cl.
*G06F 3/048* (2013.01)
*G06F 17/30* (2006.01)
*H04M 1/2745* (2006.01)

(52) U.S. Cl.
CPC .... *G06F 17/30985* (2013.01); *G06F 17/30982* (2013.01); *H04M 1/27455* (2013.01); *H04M 1/274525* (2013.01); *H04M 2250/22* (2013.01)

(58) Field of Classification Search
CPC .................................. G06F 3/00; G06F 3/048
USPC ......................................................... 345/173
See application file for complete search history.

(56) References Cited

U.S. PATENT DOCUMENTS

| | | | | |
|---|---|---|---|---|
| 5,457,738 A | * | 10/1995 | Sylvan | 379/93.23 |
| 5,828,374 A | * | 10/1998 | Coleman et al. | 715/786 |
| 5,943,055 A | | 8/1999 | Sylvan | |
| 5,963,671 A | | 10/1999 | Comerford et al. | |
| 5,982,352 A | * | 11/1999 | Pryor | 345/156 |
| 6,370,518 B1 | | 4/2002 | Payne et al. | |
| 7,007,022 B2 | * | 2/2006 | Ban | |
| 7,802,184 B1 | * | 9/2010 | Battilana | 715/257 |
| 2003/0046082 A1 | * | 3/2003 | Siegel | 704/270 |
| 2003/0197744 A1 | * | 10/2003 | Irvine | 345/856 |
| 2008/0250352 A1 | * | 10/2008 | Zaliva | 715/816 |
| 2008/0320396 A1 | * | 12/2008 | Mizrachi et al. | 715/744 |
| 2009/0030878 A1 | * | 1/2009 | Weir et al. | 707/3 |
| 2009/0273575 A1 | * | 11/2009 | Pryor | 345/173 |
| 2010/0057772 A1 | * | 3/2010 | Manolescu et al. | 707/103 R |
| 2010/0088124 A1 | * | 4/2010 | Diefendorf et al. | 705/4 |

FOREIGN PATENT DOCUMENTS

| | | |
|---|---|---|
| EP | 0457077 A2 | 11/1991 |
| EP | 1862895 A1 | 12/2007 |
| GB | 2411983 A | 9/2005 |
| WO | WO 01/54380 A2 | 7/2001 |
| WO | WO 03/041371 A1 | 5/2003 |
| WO | WO 2007/009096 A2 | 1/2007 |
| WO | WO2008/030976 A2 | 3/2008 |

\* cited by examiner

*Primary Examiner* — Quan-Zhen Wang
*Assistant Examiner* — David Lee

(57) ABSTRACT

The present disclosure relates to a directory search system. Searching can be provided in a very intuitive manner through a graphical user interface that is part of a search application provided on an electronic device. The search system can employ a first letter of a first name combined with a first letter of a last name to quickly find contacts to dial without the use of a keyboard. Each letter can be associated with a pointer that is slidable along alphabet identifiers. By filtering contacts within the directory using the first letter of the first name and first letter of the last names, the user can retrieve a short list of potential contacts that the user wishes to retrieve information about. With thousands of possible entries, filtering using the first letter of the first name and the first letter of the last name often returns a short list of matches.

13 Claims, 6 Drawing Sheets

FIG. 3

Last Name ○—304  A B C D E F G H I ⓙ K L M N O P Q R S T U V W X Y Z  First Name—306 ←302

| Jacay | Ballet | Jamin | Bodybuilding |
| Jacob | Biking | Jane | Cricket |
| Jake | Aerobics | Janelle | Curling  ←308 |
| Jalen | Boxing | Jennifer | Acrobat |
| Jamar | Casting | Joe | Archery |

Displaying 10 Global Contacts —310

QUICK DIRECTORY SEARCH SYSTEM ON A TOUCH SCREEN DEVICE AND METHODS THEREOF

TECHNICAL FIELD

This disclosure generally relates to searching, and more particularly, to sorting through a large number of items using a touch display having an interactive graphical user interface.

BACKGROUND

A common feature offered on communication devices is the ability to search through a directory of contacts in order to make a phone call. On a VoIP phone, a keypad is provided for use with the directory application whereby text is entered through the keypad to search through personal contacts. When searching, the directory application receives a first letter of the contact's last name. A list of contacts and corresponding phone numbers are presented on the phone display whose last name starts with the letter entered. The user scrolls through the letters provided on the application by hitting a key on the keypad repeatedly until the desired contact is displayed.

Searching through contacts in a large corporate directory, which in some enterprises number in the tens of thousands of entries, is very time consuming. With the advent of touch displays on some higher end VoIP phones, a QWERTY style touch keyboard has been offered to provide text whereby the text is used to search through the corporate directory. This improvement provides an easier process for entering text, which encourages entering more text resulting in a shorter list returned from the search.

While a touch keyboard is an improvement for searching, using the keyboard to enter text still provides a number of challenges. For example, touch keyboards are cumbersome as they lack a tactile feel when typing. In addition, the touch keyboards are often quite small, which result in the user accidentally hitting the wrong key. These deficiencies slow the process of entering text to narrow the directory search.

A quick directory search system on a touch display device and methods thereof allowing a user to narrow a search without having to type text on a touch display keyboard or phone keypad is needed. These, as well as other related advantages and features will be described in the present disclosure.

BRIEF DESCRIPTION OF DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objectives and advantages thereof, will be best understood by reference to the following detailed description of illustrative embodiments when read in conjunction with the accompanying drawings, wherein:

FIG. 3 is an exemplary screen shot showing matching contacts after a first letter in a first name is selected in accordance with one aspect of the present disclosure;

DESCRIPTION OF THE DISCLOSURE

Figure 1:
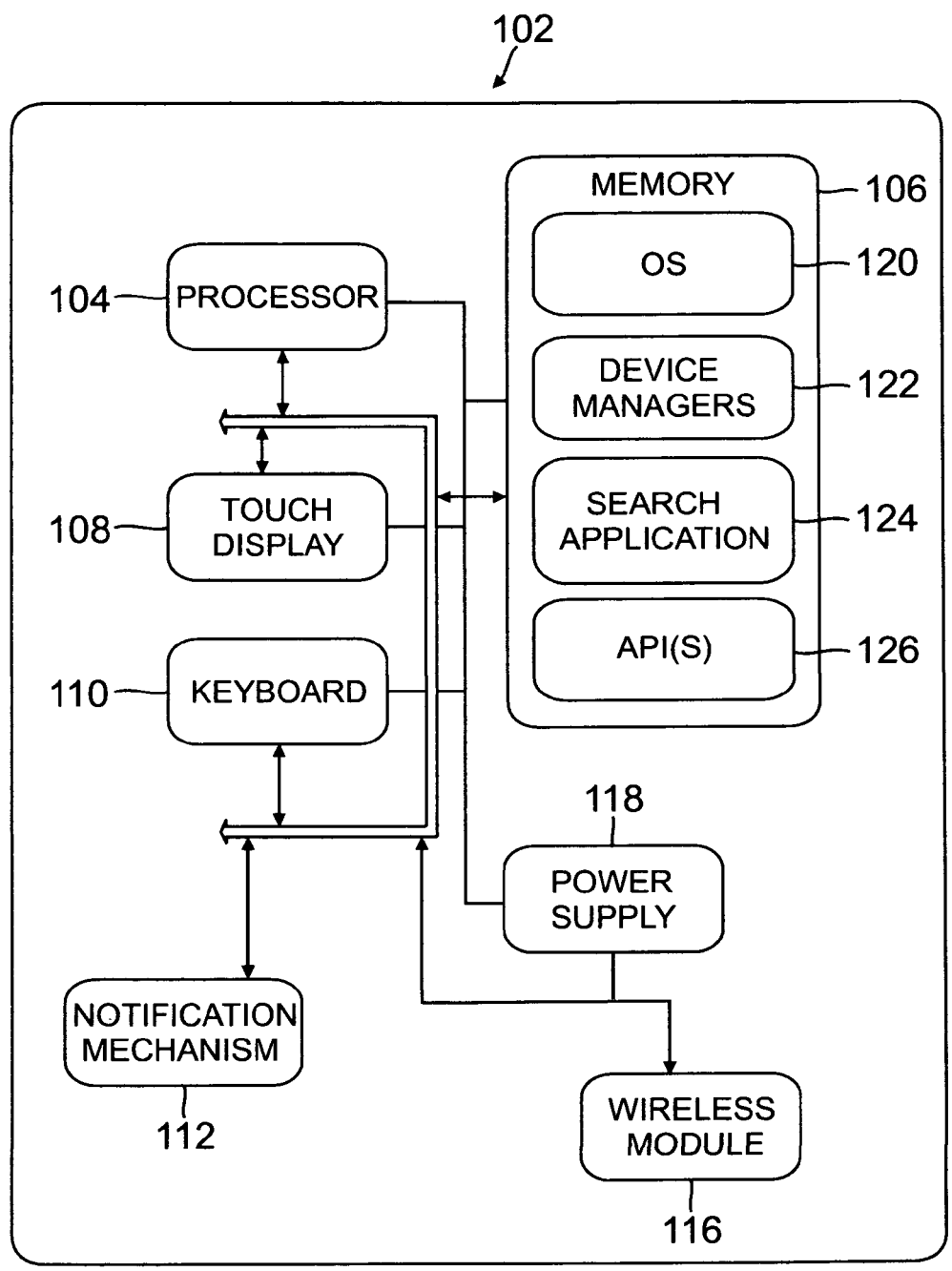
FIG. 1 is a block diagramming providing illustrative hardware and software components of an electronic device in accordance with one aspect of the present disclosure.

The description set forth below in connection with the appended drawings is intended as a description of presently preferred embodiments of the disclosure and is not intended to represent the only forms in which the present disclosure can be constructed and/or utilized. The description sets forth the functions and the sequence of steps for constructing and operating the disclosure in connection with the illustrated embodiments. It is to be understood, however, that the same or equivalent functions and sequences can be accomplished by different embodiments that are also intended to be encompassed within the spirit and scope of this disclosure.

The present disclosure relates to electronic devices. More specifically, the disclosure relates to a quick directory search system on a touch display device and methods thereof. Generally described, the search system can work with a first letter of a first name combined with a first letter of a last name as a method to quickly find contacts to dial. Searching can be provided in a very intuitive manner through a graphical user interface (GUI) that is part of a directory lookup application provided on an electronic device. By filtering contacts within the directory using both the first letter of the contact's first and last names, the user can retrieve a short list of potential contacts that the user wishes to retrieve information about. Within a large corporate directory, with thousands of entries, filtering using the first letter of the first name and the first letter of the last name often returns a fairly short list of matches making it quick to find a specific contact by scrolling through the short list until the desired contact is found.

Numerous advantages can be offered by the illustrative embodiment described above. The system provides an improvement over having to use a keypad or keyboard to enter text. By using the GUI, the user of the touch display based device can quickly narrow a directory search to a small number of results without having to type text on a touch display keyboard or phone keypad. This greatly improves the ease at which a specific contact in a large corporate directory can be located and dialed. Many additional advantages of the present disclosure will become apparent to those skilled in the relevant art as provided for in the following description.

The system can be used to search for items that have two or more characteristics. As provided in the earlier illustration, these characteristics can include a first name and last name of the contacts. A set of identifiers corresponding to the two or more characteristics of the plurality of items can then be provided, for example, an alphabet listing the first letter of both the first name and last name of the contacts. Two or more identifiers can be selected and then used to match with the two or more characteristics of the items. For example, the letter "J" can be selected for the first letter of the first name and the letter "G" can be used for the first letter of the last name within the provided alphabet. The system can then search through the plurality of items using the selected identifiers.

While described as primarily working with contacts, and more specifically searching for contacts, the system described herein can be used in a variety of other scenarios and incorporate fewer or less processes. Other items can also be classified into two or more characteristics, for example, a parts distribution system whereby a supplier is listed as one characteristic and a part number is listed as a second characteristic. To sort through the parts, both letters and numerals can be displayed as the identifiers. A user can enter in a first letter of the supplier along with a first number of a part. The system and methods described herein can be used to sort through a number of different categories of items. In one embodiment, a corporate directory, linked profiles in a social network, etc. can be searched.

Before describing embodiments of the present disclosure, an exemplary system for directory searches will be described in FIG. 1. FIG. 2 provides illustrative processes for searching through a number of contacts. Following, FIGS. 3 through 6 provide screen shots for exemplary embodiments of the system.

Figure 2:
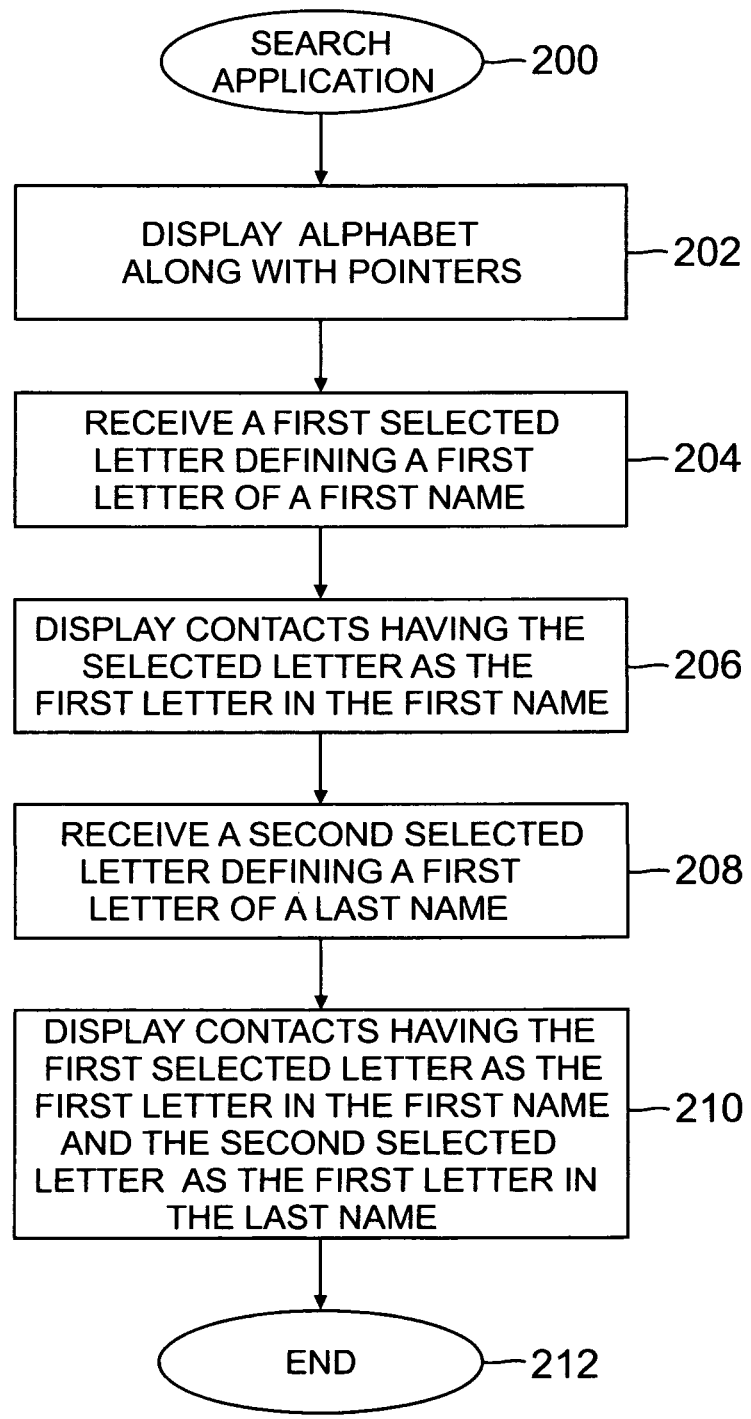
FIG. 2 is a flow chart providing exemplary processes for searching through contacts in accordance with one aspect of the present disclosure.

Turning now to FIG. 1, a block diagram providing illustrative hardware and software components of an electronic device 102 in accordance with one aspect of the present disclosure has been presented. The electronic device 102 can take the form of a conference phone, personal digital assistant (PDA), smart phone, tablet, laptop or desktop computer, handheld game console, portable media player, digital camera, camcorder, mobile phone, pager, personal navigation device or the like.

In one embodiment, the electronic device 102 can take the form of a mobile phone. The mobile phone 102 can have a processor 104 for implementing logic, a memory 106, a display 108 and a keyboard 110. The display 108 of the mobile phone 102 can be a liquid crystal display (LCD), or any other type of display commonly used in mobile devices 102. The display 108 can be touch-sensitive, and can act as an input device.

The memory 106 generally includes both volatile memory (e.g., RAM) and non-volatile memory (e.g., ROM, Flash Memory, or the like). The non-volatile portion of the memory 106 can be used to store persistent information which should not be lost when the mobile phone 102 is powered down. The mobile phone 102 can include an operating system (OS) 120, such as Google's Android™ or Windows Mobile™ available from Microsoft®, or other OS. The OS can reside in the memory 106 and be executed on the processor 104.

The memory 106 can also include one or more device managers 122 for interacting with one or more I/O devices. The device managers 122 can be software installed on the mobile phone 102. A device manager 122 can correspond to each I/O device. In addition to the device manager 122, a search application 124 can be run on the mobile phone 102, which is the subject of the present disclosure. The search application 124 can be used to filter a large number of items without having to use the keyboard 110 or keypad to set up the search such that a short list of possible matches for the desired contact is displayed. The search application 124 is generally provided through a GUI that can be supported by the OS 120. The search application 124 can be installed on the mobile phone 102 through a network connection or via a direct link. Alternatively, the search application 124 can be preinstalled and can be part of the OS 120 or other application.

The memory 106 can also include a collection of one or more APIs 126 for facilitating wireless communication between the mobile phone 102 and one or more remote I/O devices. The APIs 126 can be invoked by the applications to recognize and control the one or more remote I/O devices. In this manner, the mobile phone 102 is able to take advantage of services or functionalities of the one or more remote I/O devices.

The mobile phone 102 can also include a power supply 118, which can be implemented as one or more batteries, fuel cells, or other sources of electrical power. The power supply 118 might further include an external power source, such as an AC adapter or a powered docking cradle that supplements or recharges the batteries. The mobile phone 102 can also include one or more audio, visual, and/or vibratory notification mechanisms 112. These notification mechanisms 112 can be directly coupled to the power supply 118 so that when activated, they remain on for a duration dictated by the notification mechanism 112 even though the processor 104 and other components might shut down to conserve energy.

The mobile phone 102 can also include a wireless module 116, such as a GPS or WiFi module that facilitates wireless connectivity between the mobile phone 102 and the outside world via the communications network. While shown as a application running on top of the mobile phone 102, those skilled in the relevant art will appreciate that it can be run on a wholly dedicate device.

Referring to FIG. 2, a flow chart providing exemplary processes for searching through contacts in accordance with one aspect of the present disclosure has been presented. The technology described herein can be implemented as logical operations and/or modules in the electronic device 102 or other system. The logical operations can be implemented as a sequence of processor-implemented steps executing in one or more computer systems and as interconnected machine or circuit modules within one or more computer systems. Likewise, the descriptions of various component modules can be provided in terms of operations executed or effected by the modules. The resulting implementation is a matter of choice, dependent on the performance requirements of the underlying environment in which the described disclosure is implemented. The logical operations making up the embodiment of the disclosure described herein are referred to variously as operations, steps, objects, or modules. It should be understood that logical operations can be performed in any order, unless explicitly claimed otherwise or a specific order is inherently necessitated by the claim language.

The contacts can be stored within the memory 106 on the electronic device 102. The contacts can also be stored in a variety of other locations including a remote server. Searchable items can include contacts, but can also include other items that have two or more characteristics as described above. Using a touch display 108 displaying a GUI, the user can easily filter the items by using identifiers such as letters within an alphabet. The processes can begin at block 200.

At block 202, the search application 124 on the electronic device 102 can display identifiers in a GUI provided on the touch display 108. When searching for contacts, the identifiers can be individualized letters within the alphabet. Each of these letters can represent a first letter of a first name or a first letter of a last name. The identifiers can be listed alphabetically. The alphabet can be provided in a horizontal or vertical layout whichever is most suitable for the user.

In addition to the identifiers, two or more pointers can be displayed within the GUI on the electronic device 102. The GUI can simulate movement of the pointers. The pointers can be actuated through drag-and-drop or slide techniques through the touch display 108. The pointers can be used to select the two or more characteristics that each item has, for example, the first letter of the first name and the first letter of the last name. Alternately, the pointer can be moved by clicking above or below the desired letter.

In one embodiment, the search application 124 displays only those letters that have corresponding contacts. For example, when there are no contacts that have a first letter of a first name or a first letter of a last name with the letter "X", the letter is not listed on the GUI. In a related embodiment, when a first pointer is actuated, letters that are associated with the remaining contacts can be displayed, or conversely, letters for which there are no associated contacts can be removed or disappear. As such, the search application 124 would only display letters corresponding to the first letter of the last name for remaining contacts having the selected first letter of the first name.

At block 204, the search application 124 on the electronic device 102 can receive a first selected letter defining a first letter of a first name. The first letter of the first name can be received from the user through a pointer on the GUI labeled "First Name". The identifier received can be based on the position of the pointer within the set of identifiers. When the pointer is moved to the letter "A", for example, contacts having the first letter of the first name starting with the letter "A" are displayed on the touch display 108 at block 206.

The search application 124 can support time out sequences. In one embodiment, when the user takes more than a predetermined period of time after positioning one of the pointers without moving the second pointer, the search application 124 will consider this as a trigger to initiate the contact search. In one embodiment, the period of time can be one second. The search application 124 can support the retrieval of supplemental information for transient display. For example, holding down the last name pointer over the letter "A" can display the number of entries under this pointer in the desired location on the screen. This display can be transient and disappear once the pointer is released.

At block 208, the search application 124 on the electronic device 102 can receive a second selected letter defining a first letter of a last name. The first letter of the last name can be received from the user through a pointer on the GUI labeled "Last Name". The identifier received can be based on the position of the pointer within the set of identifiers. When the pointer is moved to the letter "G", for example, contacts having the first letter of the last name starting with the letter "G" are displayed on the touch display 108. In combination with the illustration provided above, contacts that have the first letter of the first name starting with the letter "A" and the first letter of the last name starting with the letter "G" are displayed on the touch display 108.

A time out sequence can also be implemented when receiving the first letter of the last name. If the last name pointer has been positioned but the first name pointer is not moved within the predetermined period of time, the application will consider this as a trigger to initiate the contact search. When searching for contacts, typically the search application 124 does not depend on whether the first letter of the first name or the first letter of the last name is entered first or second. In one embodiment, the user can position both first and last name pointers at the same time using two fingers, for example their thumb and forefinger. In this way the process of setting up the directory search can be done even more quickly. In one embodiment, the search application 124 can wait for both the first letter of the first name and the first letter of the last name to be entered in through the pointers on the GUI before searching for contacts. Alternately, a search button can be provided that the user must invoke before a search is initiated. This can be more practical in the case were more than two characteristics are provided for a search.

The search application 124 can determine contacts that have the first selected letter in the first letter of the first name and the second selected letter in the first letter of the last name. At block 210, the contacts can be presented on the display 108. The processes can end at block 212.

In one embodiment, when the user presses on a displayed contact, the search application 124 would dial that contact's number. If more than one number is stored for the contact, the search application 124 can allow the user to dial any of the numbers associated with the contact. A new window on the GUI can be provided to show these numbers. In addition to providing numbers, or separate therefrom, other information for the contact can be provided, for example, email addresses. In one embodiment, the user can text message, file transfer, etc. after retrieving the contact using the search application 124.

While two pointers were described above, those skilled in the relevant art will appreciate that two or more pointers can be used that correspond to two or more characteristics of an item. For example, a third pointer can be used to locate the first letter of the middle name that characterizes the contact.

As an example, FIG. 3 shows a screen shot providing matching contacts 308 after a first letter in a first name is selected in accordance with one aspect of the present disclosure. The display 108 shows a list of identifiers 302 in a standard alphabet labeled "A" through "Z". The characteristics for the contacts are the first name and the last name. In one embodiment, a user can select contacts from a number of different categories that include, but are not limited to, department, coworkers, friends and family.

The identifiers 302 represent the first letter of the first name or the first letter of the last name. A pointer 306 labeled "First Name" can be provided on the GUI of the touch display 108 whereby the pointer 306 corresponds to a characteristic. As shown, the user can simply drag the "First Name" pointer 306 using the touch display 108 until it is aligned with the first letter of the first name of the person they wish to search for.

In turn, the search application 124 can perform a search and provide the contacts 308 from that search in a GUI shown on the touch display 108. The contacts 308 starting with "J" include Jacay Ballet, Jacob Biking, Jake Aerobics, Jalen Boxing, Jamar Casting, Jamin Bodybuilding, Jane Cricket, Janelle Curling, Jennifer Acrobat and Joe Archery. In one embodiment, these contacts 308 are displayed alphabetically by their first name.

The pointer 306 can be dragged-and-dropped through the touch display 108. When dragged, the tag labeled "First Name" associated with the pointer 306 can be removed. In the embodiment shown in FIG. 3, the user intends to retrieve contacts that have a first letter of a first name starting with the letter "J". While the "Last Name" pointer 304 is shown to be positioned to the left of the identifiers 302, the "Last Name" pointer 304 can also be removed when the "First Name" pointer 306 is positioned.

In one embodiment, and as described above, the time for positioning the "First Name" pointer 306 or the "Last Name" pointer 304 can time out. When only the letter "J" has been selected by the "First Name" pointer 306 and the time to move the "Last Name" pointer 304 expires, the search application 124 can provide contacts that start with "J" in the first letter of the first name. A toolbar 310 can be provided on the GUI that indicates the number of contacts 308 showing. The toolbar 310 can be used to scroll to other contacts 308 when the total number of contacts 308 cannot be fit within the display 108.

Alternately, the user can scroll contacts horizontally or vertically by swiping their finger across the contacts display area 308.

Figure 4:
FIG. 4 is an exemplary screen shot showing matching contacts after a first letter in a first name and a first letter in a last name are selected with the contacts alphabetized by the first name in accordance with one aspect of the present disclosure.

Continuing with the previous illustration, FIG. 4 is an exemplary screen shot showing matching contacts 308 after a first letter in a first name and a first letter in a last name are selected with the contacts 308 alphabetized by the first name in accordance with one aspect of the present disclosure. The pointer 304 can have a "Last Name" tag positioned below the identifiers 302. In this illustration, the "Last Name" pointer 304 has been moved to the letter "G".

In one embodiment, the search application 124 can initially filter contacts by the first letter of the first name and then when the first letter of the last name is selected, perform an additional search. The search can also be conducted by the first letter of the last name and then the first letter of the first name. A search of the directory for the first and last name combinations can also be performed simultaneously. For example, if the person they wish to call is named Jolie Gridiron, the user could slide the "First Name" pointer 306 until it is pointing at the letter "J". The user could then slide the "Last Name" pointer 304 until it is pointing at the letter "G". The application 124 can then perform a directory search and return matched contacts 308 as shown as Jasmine GoKarting, Jessica Gambling, Joe Geocaching, Joe Gymnastics, Jolie Gridiron and Justin Golf.

When listed, the contacts 308 are presented alphabetically by the first name in accordance with the embodiment provided in FIG. 4. The contacts 308 can be alphabetized by first name from up to down and then left to right. The user can scroll through the contacts 308 that were returned until they find the person they are looking for. By pressing on a contact 308, the search application 124 can either dial the contact's number or provide other information relevant to the contact. If more than one number is stored, pressing on the contact's name can open a new window with a list of their phone numbers.

The search application 124 can handle special characters. In one embodiment, characters that have accents can be manipulated such that their root letter is used for searching. For example, if a contact has a name that starts with an accented letter such as "Á", the search application 124 can show contacts having both "A" and "Á". A toggle key or mechanism such as pressing and holding the pointer on a letter can be provided that displays a second line below the selected identifier 302 with a list of accented characters. The user can then drag the desired pointer, i.e. either the "First Name" pointer 306 or the "Last Name" pointer 304, off of the alphabet and onto the list of accented characters where they can move it until it is pointing at the desired accented character. In one embodiment, the search application 124 can work with other languages besides English. For example, French, German, Chinese or Korean can also be implemented by the search application 124.

Figure 5:
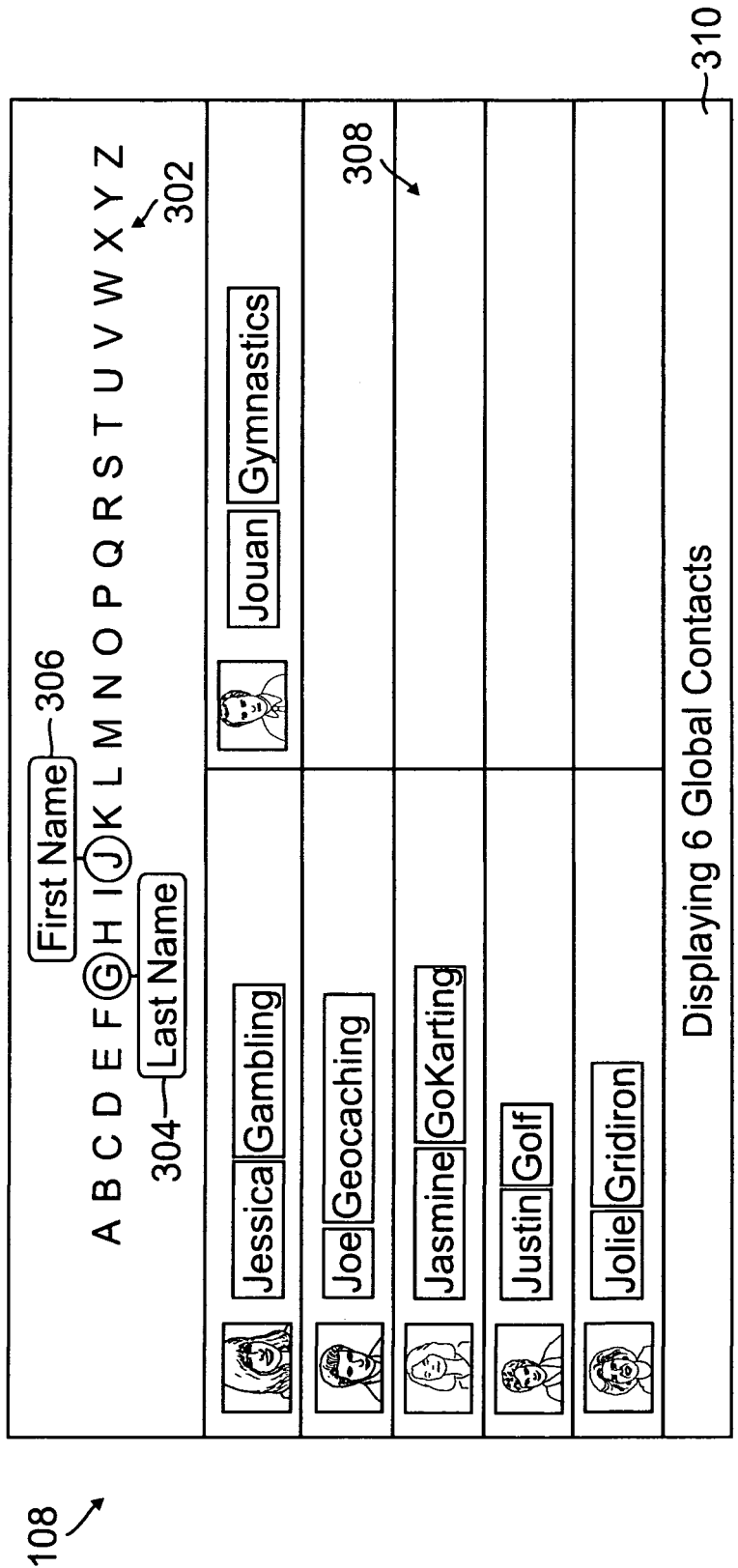
FIG. 5 is an exemplary screen shot showing matching contacts after a first letter in a first name and a first letter in a last name are selected with the contacts alphabetized by the last name in accordance with one aspect of the present disclosure.

As depicted in FIG. 5, an exemplary screen shot showing matching contacts 308 after a first letter in a first name and a first letter in a last name are selected with the contacts 308 alphabetized by the last name in accordance with one aspect of the present disclosure is provided. The contacts 308 can be alphabetized by last name from up to down and then left to right. For example, the contacts 308 are alphabetized by Jessica Gambling, Joe Geocaching, Jasmine GoKarting, Justin Golf, Jolie Gridiron and Jouan Gymnastics.

Figure 6:
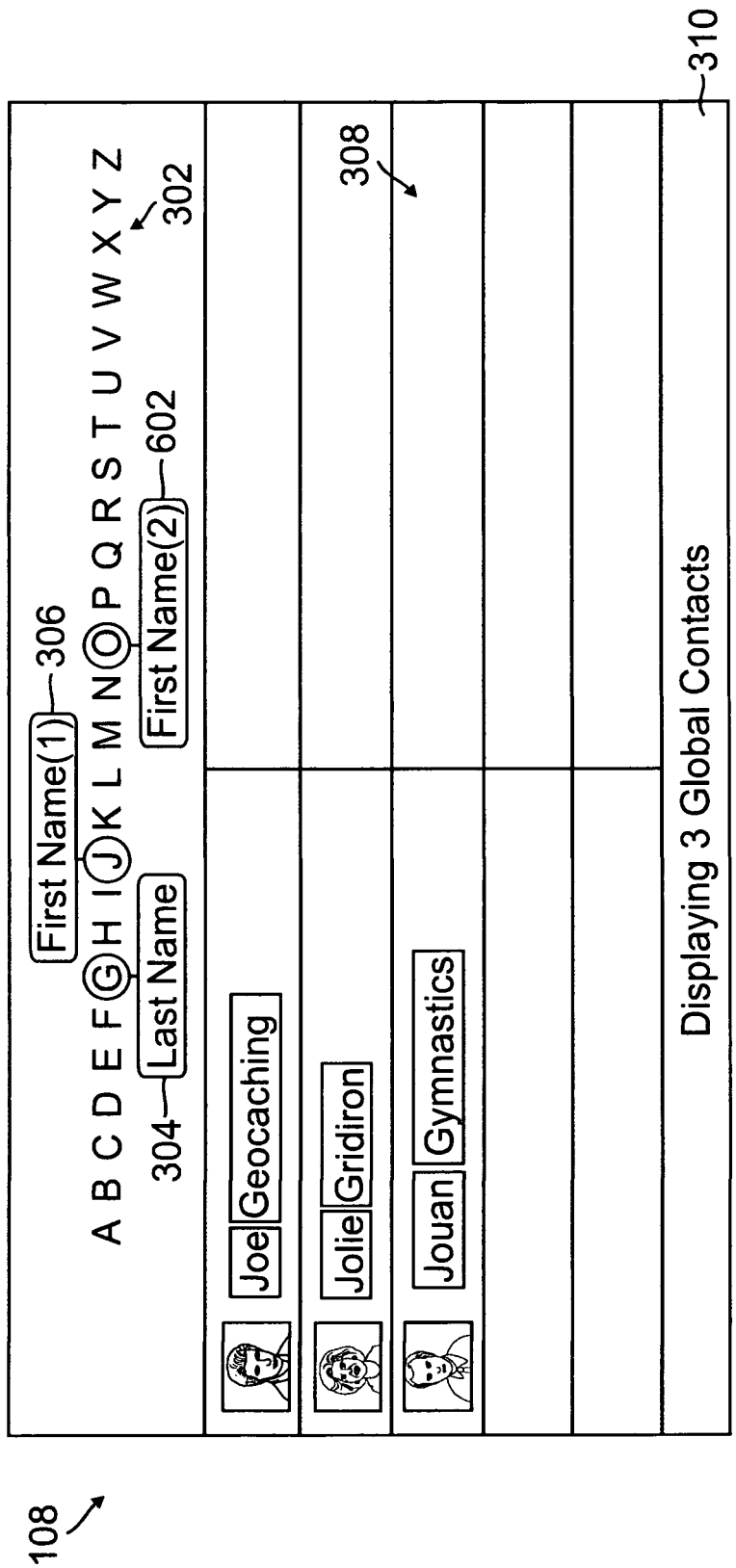
FIG. 6 is an exemplary screen shot showing matching contacts after a first and a second letter in a first name are selected in accordance with one aspect of the present disclosure.

In one embodiment, the search application 124 can match contacts 308 after a first and a second letter in a first name are selected in accordance with one aspect of the present disclosure as shown in FIG. 6. The search application 124 can allow a user to have a second "First Name" pointer 602 that can reference a second character in the first name. After the pointer 602 is positioned at a letter within the identifiers 302, the search application 124 can then use the first and second letters of the first name and the first letter of the last name to find contacts 308. For example, the second "First Name" pointer 602 can be positioned to the letter "O" such that Joe Geocaching, Jolie Gridiron and Jouan Gymnastics are displayed.

Those skilled in the relevant art will appreciate that a number of different combinations can be used. In one embodiment, only the first and second letters of the first name can be used to search for contacts 308. The first and second letters of the last name can also be used to search for contacts. In addition, the user can specify multiple letters that are within the first name or last name of the contacts 308 that do not have to be in any particular order. For example, the "First Name" pointer 306 and the second "First Name" pointer 602 can point to a third letter in the first name and a fifth letter in the first name. The secondary pointers can be displayed when the first pointers are double clicked. Other methods for retrieving the second "First Name" pointer 602 can be implemented.

The foregoing description is provided to enable any person skilled in the relevant art to practice the various embodiments described herein. Various modifications to these embodiments will be readily apparent to those skilled in the relevant art, and generic principles defined herein can be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

What is claimed is:

1. An apparatus comprising:
a touch display;
at least one processor; and
a memory operatively coupled to said processor, said memory storing program instructions that when executed by said processor, causes said processor to:
  display a graphical user interface on said touch display;
  display an alphabet on said graphical user interface;
  simultaneously provide a first pointer associated only with a first name of a plurality of contacts and a second pointer associated only with a last name of said plurality of contacts on said graphical user interface each actuated through said touch display to point to a letter within said alphabet, said first pointer comprising a first tag displayed on said graphical user interface, said first tag comprising a first indication that said first pointer is associated with said first name, and said second pointer comprising a second tag displayed on said graphical user interface, said second tag comprising a second indication that said second pointer is associated with said last name;
  receive a first letter of said first name when said first pointer is actuated through said touch display to point to a letter within said alphabet on said graphical user interface;

receive a first letter of said last name when said second pointer is actuated through said touch display to point to a letter within said alphabet on said graphical user interface;

determine contacts from said plurality of contacts having said first letter of said first name and said first letter of said last name; and display said contacts on said graphical user interface.

2. The apparatus of claim 1, wherein displaying said alphabet on said graphical user interface comprises listing only letters corresponding to said first letter of said first name and said first letter of said last name that have contacts.

3. The apparatus of claim 1, wherein determining said contacts having said first letter of said first name and said first letter of said last name comprises searching through a corporate directory.

4. The apparatus of claim 1, wherein determining said contacts having said first letter of said first name and said first letter of said last name comprises searching through linked profiles in a social network.

5. The apparatus of claim 1, wherein said memory storing program instructions, when executed by said processor, causes said processor to:

provide a third pointer associated with said first name or said last name of said plurality of contacts on said graphical user interface simultaneously with said first and second pointers and actuated through said touch display to point to a letter within said alphabet;

receive a second letter of said first name or said last name when said third pointer is actuated through said touch display to point to a letter within said alphabet on said graphical user interface;

determine contacts from said plurality of contacts having said first letter of said first name and said first letter of said last name, and said second letter of said first name or said last name; and display said contacts on said graphical user interface.

6. The apparatus of claim 1, wherein displaying said contacts on said graphical user interface comprises presenting said contacts on said graphical user interface alphabetically by said first name.

7. The apparatus of claim 1, wherein displaying said contacts on said graphical user interface comprises presenting said contacts on said graphical user interface alphabetically by said last name.

8. A method for narrowing down a plurality of contacts through a touch display displaying a graphical user interface, said method comprising:

displaying an alphabet on said graphical user interface;

simultaneously displaying a first pointer associated only with a first name of said plurality of contacts and a second pointer associated only with a last name of said plurality of contacts on said graphical user interface each actuated through said touch display to point to a letter within said alphabet, said first pointer comprising a first tag and said second pointer comprising a second tag, said first tag comprising a first indication that said first pointer is associated with said first name, and said second tag comprising a second indication that said second pointer is associated with said last name;

receiving a first letter of said first name based on a position of said first pointer along said alphabet displayed on said graphical user interface actuated through said touch display;

receiving a first letter of said last name based on a position of said second pointer along said alphabet displayed on said graphical user interface actuated through said touch display;

determining contacts from said plurality of contacts having said first letter of said first name and said first letter of said last name; and displaying said contacts on said graphical user interface.

9. The method of claim 8, comprising removing accents from said first letter of said first name and said first letter of said last name for determining said contacts from said plurality of contacts having said first letter of said first name and said first letter of said last name.

10. The method of claim 8, comprising opening a new window on said graphical user interface displaying information for a contact within said contacts.

11. The method of claim 10, comprising calling said contact.

12. The method of claim 8, wherein receiving said first letter of said first name and said first letter of said last name comprises timing out after a predetermined period of time.

13. The method of claim 8, comprising receiving a second letter of said first name or said last name and determining contacts within said plurality of contacts having said first letter of said first name, said first letter of said last name and said second letter of said first name or said last name.

* * * * *